March 12, 1968  J. E. BECKER  3,372,593
TRANSMISSION WITH FLUID OPERATED CLUTCHES AND TORSION BAR
Filed Oct. 22, 1965  2 Sheets-Sheet 1

INVENTOR.
JOHN E. BECKER
BY *Church & Rogers*
PATENT AGENTS

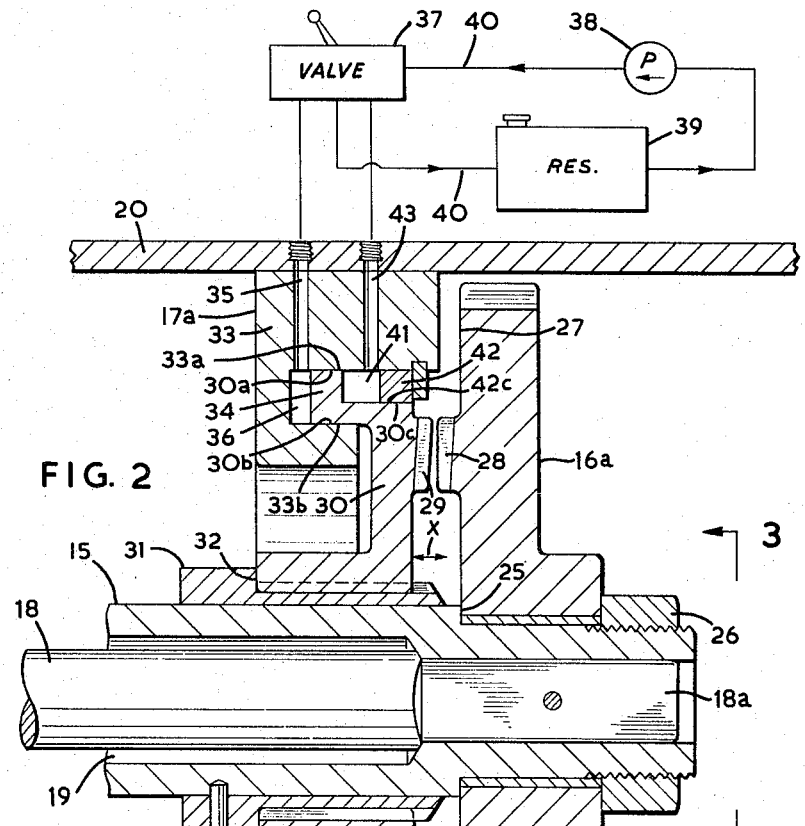

United States Patent Office 3,372,593
Patented Mar. 12, 1968

3,372,593
TRANSMISSION WITH FLUID OPERATED
CLUTCHES AND TORSION BAR
John E. Becker, Bowmanville, Ontario, Canada, assignor to Eclipse Consultants Limited, Oshawa, Ontario, Canada
Filed Oct. 22, 1965, Ser. No. 500,878
Claims priority, application Great Britain, Oct. 27, 1964, 43,470/64
1 Claim. (Cl. 74—374)

ABSTRACT OF THE DISCLOSURE

In a speed changing device including at least one clutch device, relative movement between the clutch members is produced by a piston and cylinder coaxial with the clutch members and rotatable relative to one another about their longitudinal axis; the relatively movable cylindrical surfaces parallel to the axis are sealless and fluid is pumped in sufficient quantity to maintain operating pressure despite leakage between the surfaces; the transmission path through the speed changing device includes a torsion bar which is disposed in a hollow shaft carrying respective gearwheels of the device.

---

The present invention is concerned with improvements in or relating to speed changing devices of the kind employing clutch devices.

It is an object to provide a new speed changing device of the kind specified and using a clutch device of new form.

According to the present invention there is provided a speed changing device comprising a casing, bearing means mounted by the casing, an input member and an output member mounted by said bearing means, and a transmission path connected between the input and output members comprising a first rotatable shaft and a second hollow rotatable shaft, both shafts being mounted by the said bearing means, a first gearwheel mounted on the first shaft and rotatable therewith, a second gearwheel in driving engagement with the first gearwheel and mounted on the second shaft for rotation relative thereto, a clutch device between the second gearwheel and the second shaft and selectively operable to clutch the wheel to the shaft for rotation therewith, or to permit relative rotation therebetween, and a torsion bar connected in the said transmission path between the said second shaft and one of the input and output members, the bar being mounted inside the said second shaft and extending substantially the full length of the shaft, the clutch device comprising two clutch members mounted for rotation relative to one another about coaxial axes and fluid pressure operated piston and cylinder means for moving the members towards one another for engagement thereof to permit transmission of torque between them and away from one another for disengagement thereof, one of the piston and cylinder of the said moving means being mechanically connected to one of the clutch members and rotatable therewith and the other comprising a stationary member mounted by the said casing.

A specific embodiment of the invention will now be described, by way of example, with reference to the accompanying diagrammatic drawings wherein:

FIGURE 2 is a longitudinal cross-section through a speed changing device in accordance with the invention and employing such clutch devices, and FIGURE 3 is an end elevation of a detail taken on the line 3—3 of FIGURE 2.

Figure 1:
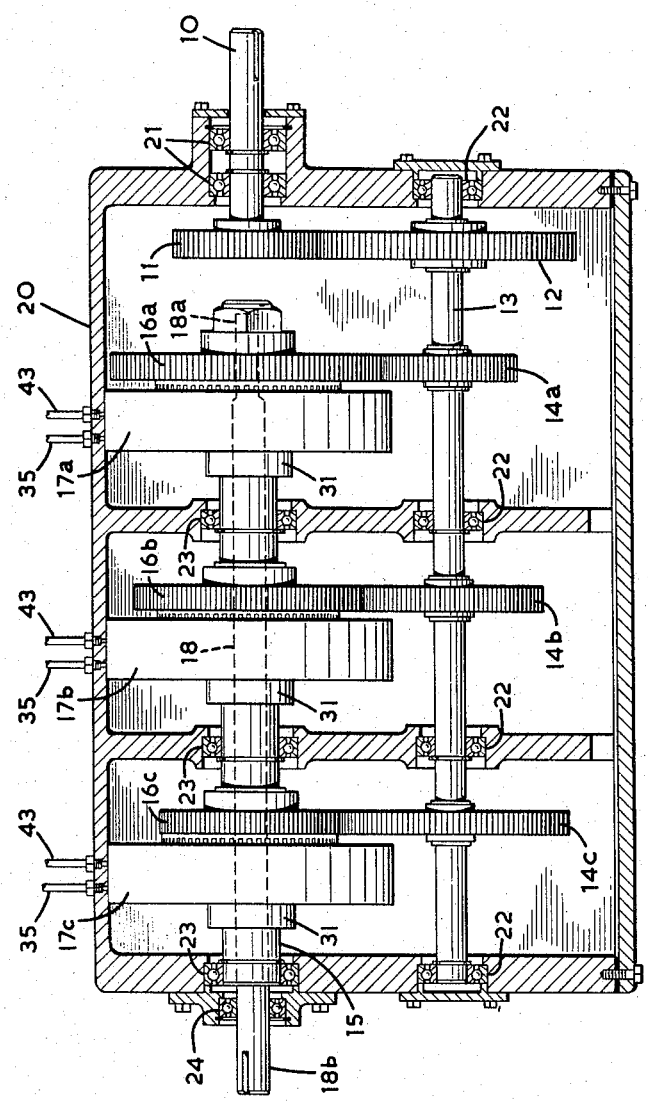
FIGURE 1 is a longitudinal plane cross-section through a clutch device.

A speed changing device embodying the invention comprises an input shaft member 10 having a toothed gear pinion 11 rotatable therewith, the pinion 11 being meshed with another toothed pinion 12 fast on a lay shaft 13 carrying three further toothed pinions 14a, 14b and 14c respectively which are of increasing diameter as they are disposed further from the pinion 12. A hollow shaft 15 is mounted for rotation about an axis spaced from and parallel with the axis of rotation of the lay shaft 13, the hollow shaft carrying thereon three toothed pinions 16a, 16b and 16c respectively, each of which is of the diameter required to mesh properly with a corresponding pinion 14a, 14b or 14c on the lay shaft, so that the pinions on the hollow shaft 15 are of decreasing diameter in the same direction in which the lay shaft pinions are of increasing diameter.

Each hollow shaft pinion wheel 16a, 16b or 16c is provided with a respective clutch device 17a, 17b or 17c which when actuated clutches the associated pinion wheel to the shaft 15 for rotation therewith, but otherwise permits the wheel to rotate freely relative thereto. Thus, the required gear ratio is selected by choice of the clutch device 17a, 17b or 17c that is actuated. An output member from the device comprises a torsion bar 18 having one end 18a connected to the hollow shaft, e.g. by being of square cross section and pinned as shown in FIGURE 3, a member (not shown) to be driven by the device being connected to the other end 18b of the bar. In this embodiment the torsion bar 18 extends through the centre bore 19 of the hollow shaft, substantially coaxially therewith, and has the said one end 18a connected to the hollow shaft 15 as closely as possible to the respective end thereof, so that as much as possible of the torsion bar lies within the hollow shaft. It is therefore possible to accommodate a relatively long torsion bar simply and inexpensively within a device of conventional length.

The speed changing device is enclosed in a casing 20 having bearings 21 mounting the input shaft 10, bearings 22 mounting the lay shaft 13, bearings 23 mounting the hollow shaft 15, and a bearing 24 for the output end of the torsion bar 18.

Reference will now be made especially to FIGURE 2 and, for convenience in description, reference will be made, for example, to pinion 16a only, but it will be understood that the pinion in question can be any one of the three pinions 16a, 16b or 16c. The hollow shaft pinion 16a rotates freely on the hollow shaft 15, but is held against axial movement by its abutment against a shoulder 25 on the shaft in one direction and against a stop nut 26 in the other direction. The pinion is provided on the radially-extending face 27 nearer to the clutch device 17 with an annulus of radially extending gear teeth 28 which are disposed and arranged to mesh with a corresponding annulus of teeth 29 carried by a piston member 30 that is mounted on the shaft 15 for axial sliding movement relative thereto by means of cooperating splines on a member 31 fixed to the shaft and on the sliding member. The axial movement X of the piston member is limited in one direction by the engagement of the sets of teeth 28 and 29 and in the opposite direction by an abutment shoulder 32 on the member 31. The splines on the member 31 cause the piston member 30 to rotate with the shaft at all times. A body member 33 of the clutch is held stationary relative to the pinion and the clutch member by being mounted on, or otherwise secured to the stationary casing 20 of the speed changing device. This body member is provided with an axially-extending annular channel constituting a cylinder into which protrudes an axially extending part 34 of the piston member, this axially extending piston part 34 also being of annular form. One or more bores 35 lead through the casing 20 and the body member 33 to the interior 36 of the space between the cylinder and piston, the application of fluid under pressure to this space by means of pipe 35, control valve 37 pump 38, and reservoir 39 and connecting pipes 40 moving the piston 30 axially to cause engagement of the clutch. A second space 41 is formed behind the piston by a stationary radially-extending ring 42 mounted on the stationary member 32 and one or more bores 43 are led through the body member to this second space, the supply of fluid under pressure to the second space 41 via bore 43, valve 37 etc. causing axial movement of the piston 30 to disengage the clutch.

The piston has two axially extending rotating surfaces 30a and 30b which engage with corresponding axially-extending stationary surfaces 33a and 33b of the body member 38, while there is a similar engagement between one axially-extending piston surface 30c and one axially-extending surface 42c of the radially-extending ring 42. These surfaces are a running fit with each other to eliminate costly seals between them, and it is found that the resultant leakage of the operating fluid is negligible compared to the excess capacity of the pump 38 normally used to supply the fluid.

Since the piston 30 rotates with the shaft 15 the need for a thrust bearing between them is eliminated. The clutch teeth 28 and 29 are shaped with a flank angle such that no self locking occurs, and such that they engage each other over the entire flank.

Such a speed changing device is particularly simple and inexpensive, and is especially suited for use in combination with a hydraulic turbo-coupling, such as that disclosed in U.S.A. Patent No. 3,045,429 and pending U.S.A. application No. 357,712, the combination providing two shock absorbing elements, namely the fluid in the coupling and the torsion bar 18 of the speed changing device itself.

The embodiments of the invention in which an exclusive property or privilege is claimed are defined as follows:

1. A speed changing device comprising a casing, bearing means mounted by the casing, an input member and an output member mounted by said bearing means, and a transmission path connected between the input and output members comprising a first rotatable shaft and a second hollow rotatable shaft, both shafts being mounted by the said bearing means, a first gearwheel mounted on the first shaft and rotatable therewith, a second gearwheel in driving engagement with the first gearwheel and mounted on the second shaft for rotation relative thereto, a clutch device between the second gearwheel and the second shaft and selectively operable to clutch the wheel to the shaft for rotation therewith, or to permit relative rotation therebetween, and a torsion bar connected in the said transmission path between the said second shaft and one of the input and output members, the bar being mounted inside the said second shaft and extending substantially the full length of the shaft, the clutch device comprising two clutch members mounted for rotation relative to one another about coaxial axes and fluid pressure operated piston and cylinder means for moving the members towards one another for engagement thereof to permit transmission of torque between them and away from one another for disengagement thereof, one of the piston and cylinder of the said moving means being mechanically connected to one of the clutch members and rotatable therewith and the other comprising a stationary member mounted by the said casing.

References Cited
UNITED STATES PATENTS

| | | | |
|---|---|---|---|
| 2,352,140 | 6/1944 | Trott | 192—86 X |
| 2,489,258 | 11/1949 | Bebinger et al. | 192—86 |
| 2,755,901 | 7/1956 | Fippard | 192—85 |
| 3,007,350 | 11/1961 | Wiseman | 74—411 X |

FOREIGN PATENTS

| | | |
|---|---|---|
| 1,240,685 | 7/1960 | France. |
| 1,373,805 | 7/1964 | France. |

BENJAMIN W. WYCHE, III, *Primary Examiner.*